F. A. COOK.
TYPE WRITING MACHINE.
APPLICATION FILED JUNE 17, 1914.
1,222,736.
Patented Apr. 17, 1917.
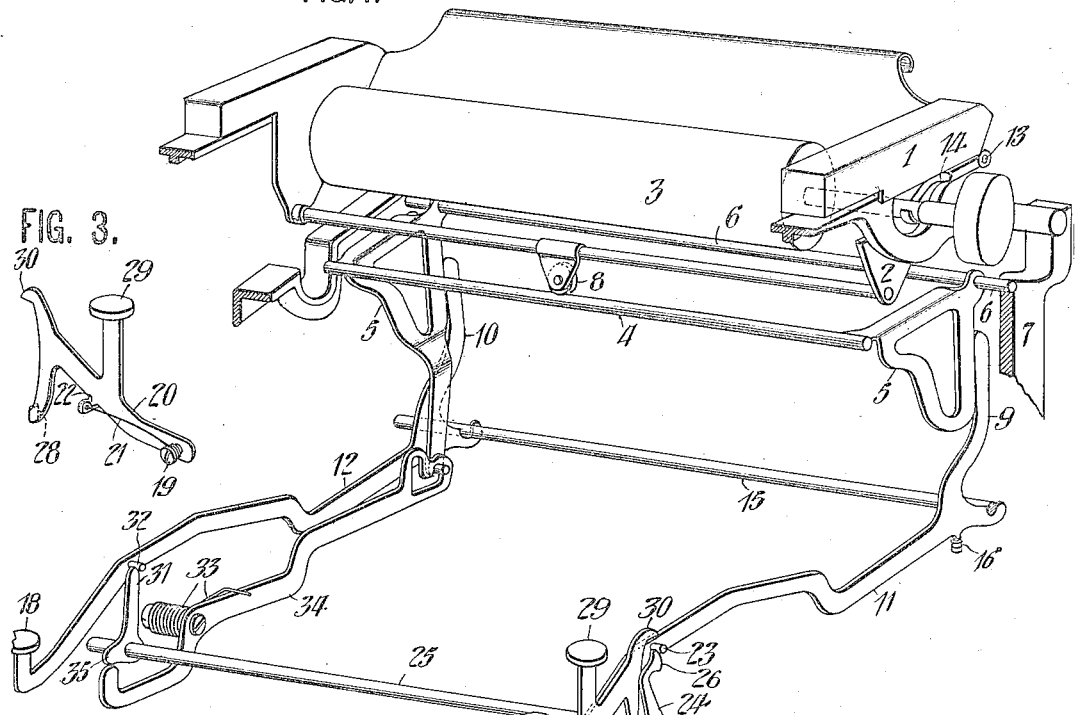
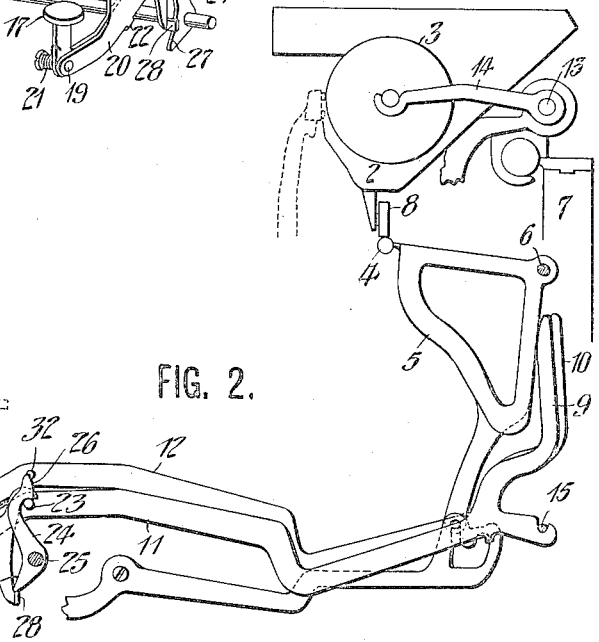
WITNESSES:
L. Bittiger
W. P. Westphal
INVENTOR:
Frank A Cook
BY B. C. Stickney
ATTORNEY.

UNITED STATES PATENT OFFICE.

FRANK A. COOK, OF HARTFORD, CONNECTICUT, ASSIGNOR TO UNDERWOOD TYPEWRITER COMPANY, OF NEW YORK, N. Y., A CORPORATION OF DELAWARE.

TYPE-WRITING MACHINE.

1,222,736.   Specification of Letters Patent.   Patented Apr. 17, 1917.

Application filed June 17, 1914. Serial No. 845,518.

*To all whom it may concern:*

Be it known that I, FRANK A. COOK, a citizen of the United States, residing in Hartford, in the county of Hartford and State of Connecticut, have invented certain new and useful Improvements in Type-Writing Machines, of which the following is a specification.

This invention relates to the case-shift mechanism of typewriting machines, and particularly to keys which lock and unlock the case-shift mechanism.

In the Underwood typewriting machine, to which my improvements are illustrated as applied, a shift-key is provided at the left-hand side of the key-board, for the usual purpose of shifting the mechanism to capital printing position; and at the right-hand side of the key-board, it is customary to provide a similar shift key, which upon being depressed, will not only shift the mechanism to capital printing position, but will also lock it in such position; and a release of said lock could be effected by depressing said shift key at the left-hand side of the keyboard.

It is found desirable in practice, that there should be not only a key at the left, but also one at the right of the key-board for effecting a temporary shift of the mechanism to capital printing position, so that the operator may depress by either his left hand or his right hand, a capital shift key, and so that upon releasing either of said keys, the mechanism will shift back to its normal position.

An object of my invention is to provide a simple and inexpensive means readily applicable to existing machines in manufacture for effecting this result of having either the left-hand or the right-hand key usable for a temporary shifting of the shift mechanism, while I also make a provision for permanently shifting said mechanism, that is for locking the case-shift mechanism in its shifted position. In the case of the Underwood machine, the shift keys lift the platen so that the capital types will strike thereon.

According to my present improvements, the left-hand shift key serves for temporarily shifting and also for releasing the platen when it has been locked up. The right-hand shift key is mounted on a platen-shifting lever which is used for temporary shifting. Upon the right-hand key lever is a pin or projection, and pivotally mounted upon the frame of the machine is a spring-pressed latch, the office of which is to catch over said pin or projection to lock down said right-hand shift key when the latter is depressed; but I mount upon the right-hand key lever a foil or trip which disables said latch, so that it is prevented from catching over said pin. A spring retains this trip in normal position, so that whenever said right-hand shift key is depressed, the latch is unable to catch over the pin.

To make it possible to lock down the right-hand shift key, I provide a separate key which is mounted upon said trip to press the same down to ineffective position so that it cannot restrain said latch or lock from catching over the pin on said shift key lever. This trip, which may be in the form of a lever, is capable of limited movement upon the main shift key lever; serving in its elevated position to render said latch ineffective, and also serving when pressed down by the finger of the operator, to release said latch to enable it to catch over the pin. A key on this trip also serves to shift the platen. From this, it results that the left-hand key lever may be used for temporary shifting of the platen, and that the right-hand key lever may be employed for the same purpose, and that the trip key may be depressed for shifting the platen and locking the same in its shifted position.

The latch may be released by the means usual in the Underwood typewriting machine, a pin upon the left-hand key lever engaging a cam, and the latter fixed on a rock shaft which extends across the machine, and carries the latch heretofore mentioned, whereby said latch is rocked away and releases the right-hand shift key lever, so that the same returns to normal position together with the platen.

Thus by a simple provision, the operator is enabled to shift the platen temporarily and quickly up or down, with either the right or left hand, while at any time he may lock the platen up for writing a line of capitals, and release the same by the usual key.

Other features and advantages will hereinafter appear.

In the accompanying drawing,

Figure 1 is a front perspective elevation showing a portion of a typewriter carriage, the platen frame, and mechanism with operating keys for shifting the platen vertically.

Fig. 2 is a side elevation of the same showing the platen as shifted to the upper-case position, and the shifting mechanism locked.

Fig. 3 is a perspective detail view of the foil device and trip for the latch or lock, with lever and key to shift and lock the platen in shifted position.

Fig. 4 is a detail partial side elevation showing the right-hand key lever for the temporary and permanent shifting of the platen with the foil and lock-trip device mounted thereon, the foil being here shown as preventing the operation of the latch or lock, the left-hand temporary shift lever also being shown.

Fig. 5 is a similar view illustrating the lock releasing means operating in conjunction with the depression of the left-hand shift lever.

The operating parts of an Underwood typewriting machine to co-act with this invention, and here shown to afford a full comprehension thereof, include the carriage 1, a portion only whereof is illustrated, the platen frame 2, the platen 3 mounted therein, the swinging rail 4 supported by brackets 5 mounted on rock shaft 6, which is journaled in the machine frame 7, the rail 4 supporting the platen frame by means of roller 8 thereon, and said rail 4 being shiftable through the contacting swinging action of the extensions 9, 10, respectively, of the shift levers 11 and 12; the platen frame being guided in its shifting movements by the rock shaft 13 having frame-engaging arms 14.

The key levers 11 and 12, fulcrumed on a shaft 15 and held normally elevated as by spring 16, are provided respectively with finger-keys 17 and 18 arranged respectively at the right and left hand sides of the machine, in the usual arrangement relative to the keyboard.

Said finger-keys 17 and 18 are temporary shift keys by means of which the operator may shift the platen to the upper-case position, as for writing capitals and other upper-case characters, with either the left or right hand holding the finger-key depressed for temporary use of the platen in that shifted position, and releasing the key to allow the platen to resume its normal or lower-case position, the advantage of this feature of the invention being that the occasion for a temporary shift may occur when either one of the operator's hands can more conveniently be used for actuating the shift lever than the other. It is a purpose of my invention to provide the convenience aforesaid in addition to the provision of means at one side of the machine whereby the shift mechanism may be locked when the platen has been shifted to the upper-case position.

The feature of my invention wherein I provide the dual capacity at one side of the machine of shifting the platen either temporarily or permanently at will involves a mechanical arrangement whereby the shift lever in question being provided with two separate finger-keys, has a lock which is held out of engagement when one of these keys is operated, and is allowed to perform its function when the other key is operated.

Assuming the dual shift device to be arranged at the right-hand side of the machine, as shown in the drawing, the key lever 11 has pivotally mounted thereon at 19 a short rearwardly extending lever 20, a spring 21 pressing said lever 20 upwardly, and a lug 22 on said lever 20 engaging with the lever 11 to hold said levers normally in parallelism.

The lever 11 has a lateral projection or pin 23, a locking latch 24 mounted on a rock shaft 25 that is journaled in the machine frame being adapted to engage said projection 23 when the lever 11 is depressed and it is desired to lock the shift mechanism. Said latch 24 has a rear cam surface 26, which engages the projection 23 at the depression of the lever 11, whereby said latch and the rock shaft 25 are rocked forwardly during descent of said projection past said cam surface before engagement of the projection with the catch, the rock shaft 25 being under spring tension in this rocking action and throwing the latch over the projection to effect the lock when the projection 23 has passed the cam surface 26.

But when the finger-key 17 is to be depressed for the temporary shifting operation, it is not desired that the latch 24 shall engage with the projection 23, and the latch 24 is therefore provided with a forward cam surface 27 below the pivot 25 thereof, and the lever 20 carries a foil or lug 28 to coöperate with said cam surface 27 during the depressing movement of lever 11 to move and hold the latch 24 and to thereby prevent the rock shaft 25 from swinging the catch 24 into engagement with the projection 23 when said lever is fully depressed.

At the point of maximum depression of the lever 11 through the actuation of finger-key 17, the latch 24 will present its cam surface 27 to the foil or lug 28 in the position shown in Fig. 4, the latch 24 thus being inoperative. Under these circumstances the lever 11 acts only as a temporary shift device.

When it is desired to operate the key lever 11 for shifting the platen and locking it in the shifted position, a second finger-key 29, forming a permanent shift key for said lever, is depressed, said finger-key 29 being mounted on the lever 20, which, in addition to carrying the foil or lug 28, also has a hook 30 lying above the projection 23 and normally spaced therefrom.

Upon depressing the finger-key 29, the lever 20 yields separately from lever 11, against the tension of spring 21, until the hook 30 reaches and engages the projection 23, whereupon said lever 11 is carried downwardly with the further depression of lever 20 to shift the platen upwardly in the same manner as though the key 17 had been operated. While the degree of depression of the key lever 11 when operated by finger-key 17 carries the foil 28 to its operative position shown in Fig. 4 to prevent engagement of the lock, the lever 20 is capable of depression to a greater extent in which to carry the foil 28 below the cam surface 27, to thereby release the latch 24 and allow the spring-actuated rock shaft 25 to swing the latch 24 into engagement with the projection 23, thus locking the lever 11 in the shifted position. The hook 30 on lever 20 becoming seated upon projection 23 while said lever 20 is being depressed, thus communicates the movement of lever 20 to lever 11, and thereby permits the key 29 to operate the shift lever and enables it to become locked in the shifted position.

The foil or lug 28, when passed beyond the cam 27 to trip the catch, engages beneath the catch through the tension of the return springs for levers 11 and 20, thereby forming practically a double lock, because the latch 24 is thus held both by its upper or hook portion and the back of its lower portion.

In order to release the locking engagement aforesaid, the latch 24 is swung rearwardly by independent means. The rock shaft 25 carrying said latch 24 also carries a cam 31 lying in the path of a projection or pin 32 upon a key lever such as that shown at 12. The rock shaft 25, as before stated with regard to the latch 24, is urged to rock in that direction which enables it to move the catch rearwardly, and consequently to also urge the cam 31 rearwardly. The tensional means here shown for so controlling the rock shaft 25 comprises a spring 33 bearing upon a lever 34 which engages a cam 35 upon the rock shaft at an angle to the cam 31, but obviously other spring controlling means may be employed.

The lever 12, as before stated, may be depressed for the temporary shifting of the platen, and in addition to that function it serves as a release for the lock shift. The mode of operation when releasing the lock is illustrated in Fig. 5, wherein the lever 12 is represented as partly depressed, with the projection 32 displacing the cam 31, thereby rocking the shaft 25 so that the cam 27 rides rearwardly over the foil 28 and is in fact at Fig. 5 shown in the act of leaving said foil, the latch at the same time leaving the projection 23 (not shown in Fig. 5), and thereby allowing the lever 11 to return to normal position.

The separate shift levers 11 and 12, with their finger-keys, may, as usual, be provided at the opposite sides of the bank of keys, as 36, for convenience in enabling the operator to manipulate them respectively with the right and left hands, and the desirability of using either one of said key levers for temporary shifting purposes is apparent, particularly as the mere addition of a further key upon one of these levers enables it to be also employed as a shift lock. When the key for the shift lock is provided upon the right-hand lever, the practice is identical with that in vogue, and also when the left-hand lever is used as the lock release, the operator has no new arrangement to learn, but is supplied with the advantage of being able to use either hand for the temporary shifting of the platen.

The temporary key 17 has a shorter range of movement than the permanent key 29, which is an advantage because the temporary shift is much more frequently used than the permanent or locking shift, and it is desirable in temporarily shifting the platen, to eliminate all lost motion in the shift key, so that the entire stroke of the key is utilized in shifting the platen, and said stroke may be as short as is consistent with an easy shifting of the platen. The permanent key 29 has a movement about the pivot 19 in addition to its movement with the shift lever 11, which enables it to free the lock for action, so that the platen is locked in shifted position.

Variations may be resorted to within the scope of the invention, and portions of the improvements may be used without others.

Having thus described my invention, I claim:

1. The combination of a shift key lever, a permanent key to operate said lever, a lock effective at the operation of the lever by said permanent key to hold the lever permanently in operated position, a temporary key to operate said lever, and a releasable trip carried by said permanent key normally effective at the operation of the lever by said temporary key to move and hold the lock in ineffective position, said trip movable by said permanent key from an operative to an inoperative position.

2. The combination of a shift key lever, a lock to hold the lever in operated position, a releasable trip normally effective at the operation of the lever to move and hold the lock in ineffective position, and a lever-operating key connected to said trip for moving the trip relatively to the lever to a position in which it is ineffective to prevent operation of the lock, said lock effective at the operation of the lever by said key to lock the lever in its operated position.

3. The combination with a shift lever and a key to actuate the same, of a lock, a device operative when the lever is actuated by said key, to disable said lock, and an auxiliary key for operating said lever, said auxiliary key having a limited movement relatively to the lever, said disabling device being operable by said auxiliary key to a position to release the lock, said lock operable automatically at the operation of the lever by said auxiliary key, to lock the lever in operated position.

4. The combination with a shift lever and a key to actuate the same, of a lock, a device operative when the lever is actuated by said key, to disable said lock, an auxiliary key for operating said lever, said auxiliary key having a limited movement relatively to the lever, said disabling device being operable by said auxiliary key to a position to release the lock, said lock operable automatically at the operation of the lever by said auxiliary key, to lock the lever in operated position, a second shift lever operable independently of the first-mentioned lever, and means operated by said second lever to unlock the first lever.

5. In a typewriting machine, the combination of a key-actuated case-shift lever, a lock, a spring to throw the lock into locking engagement with the lever, a trip carried by the lever and normally operative to hold the lock out of use when the lever is operated, and an auxiliary key to operate said lever and to move the trip relatively to the lever to release the lock, whereby the lever is automatically locked when actuated by the auxiliary key.

6. In a typewriting machine, the combination of a key-actuated case-shift lever, a lock, a spring to throw the lock into locking engagement with the lever, a trip carried by the lever and normally operative to hold the lock out of use when the lever is operated, an auxiliary key to operate said lever and to move the trip relatively to the lever to release the lock, whereby the lever is automatically locked when actuated by the auxiliary key, a second case-shift lever, a rock shaft to which said lock is connected, and a cam on said rock shaft actuated by said second lever to swing the lock to ineffective position, whereby said second lever may be operated to release the first-mentioned lever.

7. In a typewriting machine the combination with a shiftable platen, of a temporary shift lever for shifting said platen, a permanent shift key carried by said lever, a lock normally in effective position to lock the platen in shifted position, a trip carried by said permanent key for engaging and shifting said lock to ineffective position on depression of said temporary key, said permanent key engaging and shifting said lock, but passing to a position free therefrom on operation of said permanent key.

8. In a typewriting machine, the combination with a shiftable platen, of a shift lever having a finger key, a lock for said lever, a lock-controlling device movably mounted on said lever to control the lock and operable when the lever is depressed by said key to render the lock ineffective, said controlling device having a finger key whose operation serves to both shift the platen and move said controlling device on said lever into position to permit the lock to lock the lever in its depressed position, and releasing means for said lock independent of said keys.

9. In a typewriting machine, the combination with a shiftable platen, of a shift lever, a lock therefor normally in effective position, a lock disabling device movably mounted upon said lever and operable while in its normal position on the lever to engage and move to thereby disable said lock when the lever is operated, thereby causing the lever to only temporarily shift the platen, and a key to operate the lever and move said disabling device to ineffective position on the lever, whereby the platen is shifted and locked.

10. In a typewriting machine the combination with a shiftable platen, of a shift lever therefor, a lock for said lever, a disabling device upon said lever operable while in its normal position on the lever to disable said lock causing the lever to only temporarily shift the platen, a key operable to shift said lever and concomitantly disable the lock disabling device and thereby render said lock effective, a second shift lever for said platen and means operable by said second shift lever for also disabling said lock.

11. In a typewriting machine the combination with a shiftable platen, a shift lever, a pivotal latch normally effective to engage said lever when depressed, a foil having a normal position on said lever in which it is operable to engage and move to thereby disable said latch when the lever is depressed and a key on said foil for depressing the lever and shifting the foil to inoperative position whereby the latch is rendered operative to lock the lever in shifted position.

12. In a typewriting machine, the combination with a shiftable platen, of a shifting lever therefor, means to lock the platen in its shifted position, a device to prevent operation of the lock, two keys on said lever for individually operating the lever, one of said keys serving to temporarily shift the plates, the other key having a limited movement relatively to the lever, and serving to both shift the platen and move said lock-preventing device to inoperative position to thereby permit operation of the lock, so that the platen is locked in its shifted position, and another lever operable to release the lock.

13. In a typewriting machine, the combination with a shiftable platen, of a shifting lever therefor, two finger keys for individually operating said lever, a lock, a device to prevent operation of the lock, one of said keys serving to temporarily shift the platen and hold said lock inoperative, so that the platen will not be locked, the other key having a limited movement relatively to said lever, and serving by its combined movement with and relatively to the lever to both shift the platen and release said lock-preventing device, permitting the lock to lock the platen in shifted position, and another lever operable to temporarily shift the platen, and also operable when the platen is locked in shifted position, to release it.

14. In a typewriting machine, the combination with a shiftable platen, of shifting levers therefor arranged respectively at the right and left sides of the machine, a key on each lever, the depression of either one of said keys serving to temporarily shift the platen, a lock to hold the platen in its shifted position, a lock-preventing device operable to prevent operation of the lock when either of said keys is depressed, a permanent shift key pivoted on one of said levers, the depression whereof both shifts the platen and swings the permanent key about its pivot, and thereby moves the lock-preventing device to inoperative position to permit the lock to hold the platen in shifted position, and means operable by the key on the other lever to release the lock.

15. In a typewriting machine, the combination with a shiftable platen, of shifting levers therefor arranged respectively at the right and left sides of the machine, a temporary shift key for each lever, the depression of either one of said keys serving to temporarily shift the platen, a permanent shift key shiftably mounted on said right-hand lever, a lock for said right-hand lever rendered inoperative by the operation of a temporary shift key, and a lock preventing device operable when said permanent key is depressed, whereby the operation of said permanent key both shifts the platen and locks it in shifted position, the depression of the left-hand key serving to release the lock.

16. In a typewriting machine, the combination with a shiftable platen, of a right-hand shift lever and a left-hand shift lever, said levers separately operating to temporarily shift the platen, a projection on said right-hand lever, a pivotal spring-pressed latch adapted to engage said projection for locking said lever when depressed, a foil mounted to swing on said lever and normally positioned on the lever to prevent said latch from engaging said projection when the lever is depressed, whereby said lever normally operates as a temporary shift lever, and a key to depress said lever and swing the foil into position to release the latch and permit it to lock the lever in depressed position.

17. In a typewriting machine, the combination with a shiftable platen, of a right-hand shift lever and a left-hand shift lever, said levers separately operating to temporarily shift the platen, a projection on said right-hand lever, a pivotal spring-pressed latch adapted to engage said projection for locking said lever when depressed, a foil carried by said lever to normally prevent said latch from engaging said projection, whereby said lever normally operates as a temporary shift lever, and means for moving said foil to release said latch in the depression of said lever to thereby permit said latch to engage said projection and lock the lever in shifted position.

18. In a typewriting machine, the combination with a shiftable platen, of a right-hand shift lever and a left-hand shift lever, said levers separately operating to temporarily shift the platen, a projection on said right-hand lever, a pivotal spring-pressed latch adapted to engage said projection for locking said lever when depressed, a foil carried by said lever to normally prevent said latch from engaging said projection, whereby said lever normally operates as a temporary shift lever, and means for moving said foil to release said latch in the depression of said lever to thereby permit said latch to engage said projection and lock the lever in shifted position, the depression of said left-hand lever serving to release said latch and allow the right-hand lever to return to normal position.

19. In a typewriting machine, the combination with a shiftable platen, of a right-hand shift lever and a left-hand shift lever, said levers separately operating to temporarily shift the platen, a projection on said right-hand lever, a pivotal spring-pressed latch adapted to engage said projection for locking said lever when depressed, a spring-held foil or trip carried by said lever to normally prevent said latch from engaging said projection, whereby said lever normally operates as a temporary shift lever, and a key carried by said foil and operable when depressed, to depress the lever and also to render said foil ineffective, whereby engagement of the latch with said projection is effected and the lever held in shifted position.

20. In a typewriting machine, the combination with a shiftable platen, of a right-hand shift lever and a left-hand shift lever, said levers separately operating to temporarily shift the platen, a projection on said right-hand lever, a pivotal spring-pressed latch adapted to engage said projection for locking said lever when depressed, a spring-held foil or trip carried by said lever to normally prevent said latch from engaging said projection, whereby said lever normally operates as a temporary shift lever, and means for moving said foil to release said latch in the depression of said lever to thereby permit said latch to engage said projection and lock the lever in shifted position.

21. In a typewriting machine, the combination with a shiftable platen, of a right-hand shift lever and a left-hand shift lever, said levers separately operating to temporarily shift the platen, a projection on said right-hand lever, a pivotal spring-pressed latch adapted to engage said projection for locking said lever when depressed, a spring-held foil or trip carried by said lever to normally prevent said latch from engaging said projection, whereby said lever normally operates as a temporary shift lever, and means for moving said foil to release said latch in the depression of said lever to thereby permit said latch to engage said projection and lock the lever in shifted position, the depression of said left-hand lever serving to release said latch and allow the right-hand lever to return to normal position.

22. In a typewriting machine, the combination with a shiftable platen, of right and left-hand shift levers each having a finger key, each of said levers being separately operable to temporarily shift the platen, a projection on one of said levers, a spring-pressed pivotal latch having a cam surface to engage said projection and move said latch into position to lock over said projection upon the depression of said lever, a spring-held foil or trip mounted on said lever normally engaging said latch to prevent it from engaging with said projection whereby said lever operates as a temporary shift lever, and a finger key for said foil or trip, the depression whereof releases said foil from said latch and trips the latter into locking engagement with said lever as the latter is depressed.

23. In a typewriting machine, the combination with a shiftable platen, of right and left-hand shift levers each having a finger key, each of said levers being separately operable to temporarily shift the platen, a projection on one of said levers, a spring-pressed pivotal latch having a cam surface to engage said projection and move said latch into position to lock over said projection upon the depression of said lever, a spring-held foil or trip mounted on said lever normally engaging said latch to prevent it from engaging with said projection whereby said lever operates as a temporary shift lever, a finger key for said foil or trip, the depression whereof releases said foil from said latch and trips the latter into locking engagement with said lever as the latter is depressed, and means operated by the other lever to release said locking engagement.

24. In a typewriting machine having a shiftable platen, the combination with a right-hand shift lever and a left-hand shift lever each having a finger key, each of said levers being separately operable to temporarily shift the platen, a rock shaft, a latch carried by said rock shaft, a spring to rock said shaft and urge said latch rearwardly, a projection on one of said levers, said latch having a cam surface in the path of said projection, whereby said latch is swung forwardly upon the depression of said lever to be thereby in position to engage with said projection, an auxiliary lever pivoted on said shift lever, a supporting spring therefor, a foil carried by said auxiliary lever to engage said latch and normally restrain said latch from engaging with said projection, and a finger key for said auxiliary lever to depress the latter and the shift lever, the depression of said auxiliary lever causing the foil to trip the latch and allow it to enter into locking engagement with said projection.

25. In a typewriting machine having a shiftable platen, the combination with a right-hand shift lever and a left-hand shift lever each having a finger key, each of said levers being separately operable to temporarily shift the platen, a rock shaft, a latch carried by said rock shaft, a spring to rock said shaft and urge said latch rearwardly, a projection on one of said levers, said latch having a cam surface in the path of said projection, whereby said latch is swung forwardly upon the depression of said lever to be thereby in position to engage with said projection, an auxiliary lever pivoted on said shift lever, a supporting spring therefor, a foil carried by said auxiliary lever to engage said latch and normally restrain said latch from engaging with said projection, a finger key for said auxiliary lever to depress the latter and the shift lever, the depression of said auxiliary lever causing the foil to trip the latch and allow it to enter into locking engagement with said projection, and a cam near the opposite end of said rock shaft, the other shift lever having a projection to engage said cam, thereby rocking said shaft to release the locking engagement of said latch as said other lever is depressed.

26. In a typewriting machine having a shiftable platen, the combination of a right-hand shift lever and a left-hand shift lever each having a finger key, each of said levers being separately operable to temporarily shift the platen, a rock shaft, a latch carried by said rock shaft, a spring to rock said shaft and urge said latch rearwardly, a projection on said right-hand lever, said latch having a cam surface in the path of said projection, whereby said latch is swung forwardly upon the depression of said right-hand lever to be thereby in position to engage with said projection, an auxiliary lever pivoted to said right-hand shift lever, a supporting spring therefor, a foil carried by said auxiliary lever to engage said latch and normally restrain said latch from engaging with said projection, and a finger key for said auxiliary lever to depress the latter and the right-hand shift lever, the depression of said auxiliary lever causing the foil to trip the latch and allow it to enter into locking engagement with said projection.

27. In a typewriting machine having a shiftable platen, the combination of a right-hand shift lever and a left-hand shift lever each having a finger key, each of said levers being separately operable to temporarily shift the platen, a rock shaft, a latch carried by said rock shaft, a spring to rock said shaft and urge said latch rearwardly, a projection on said right-hand lever, said latch having a cam surface in the path of said projection, whereby said latch is swung forwardly upon the depression of said right-hand lever to be thereby in position to engage with said projection, an auxiliary lever pivoted to said right-hand shift lever, a supporting spring therefor, a foil carried by said auxiliary lever to engage said latch and normally restrain said latch from engaging with said projection, a finger key for said auxiliary lever to depress the latter and the right-hand shift lever, the depression of said auxiliary lever causing the foil to trip the latch and allow it to enter into locking engagement with said projection, and a cam near the opposite end of said rock shaft, the left-hand shift lever having a projection to engage said cam, thereby rocking said shaft to release the locking engagement of said latch as said left-hand lever is depressed.

28. In a typewriting machine, a case-shifting mechanism including a shiftable member, in combination with two levers, each having a key at its forward end and fulcrumed at its rear end and connected to said shiftable member in a manner such that each key may temporarily shift said member without movement of the other key, the connection between each key and said shiftable member being positive, so that the first portion of the depression of either key initiates the movement of said shifting member, a permanent shift key lever mounted upon one of said temporary key levers, a locking device to coöperate with said permanent shift key, said permanent key having certain movement for controlling the lock and additional movement for shifting said shiftable member, and means to enable the other temporary shift key to release the lock.

FRANK A. COOK.

Witnesses:
W. M. DYORKMAN,
LYMAN D. BROUGHTON.